United States Patent [19]

Miller, Jr. et al.

[11] 4,418,109

[45] Nov. 29, 1983

[54] DURABLE, LOW-MAINTENANCE FLOORING TILE

[75] Inventors: Jesse D. Miller, Jr., Lancaster; James A. Tshudy, Ephrata; Ralph E. Unruh, Denver, all of Pa.

[73] Assignee: Armstrong World Industries, Inc., Lancaster, Pa.

[21] Appl. No.: 362,645

[22] Filed: Mar. 29, 1982

[51] Int. Cl.³ ............................ B32B 3/00; B32B 5/16
[52] U.S. Cl. .................................... 428/142; 428/143; 428/156; 428/161; 428/172; 428/323; 428/325; 428/331
[58] Field of Search ............... 428/142, 143, 156, 161, 428/323, 325, 331, 172

[56] References Cited

U.S. PATENT DOCUMENTS

| | | | |
|---|---|---|---|
| 4,172,169 | 10/1979 | Mawson et al. | 428/161 |
| 4,196,243 | 4/1980 | Sachs et al. | 428/47 |
| 4,336,293 | 6/1982 | Eiden | 428/143 |
| 4,348,447 | 9/1982 | Miller, Jr. et al. | 428/143 |

Primary Examiner—Paul J. Thibodeau

[57] ABSTRACT

A decorative plastic floor tile composed of a decorative plastic base having a plurality of elements positioned on the base with a clear or translucent wear layer overlying the elements and the base. The base has raised and depressed areas. The elements comprise particles, preferably inorganic and rounded, and these are embedded in a plastic matrix which is placed only on the raised areas of the base. The particles are distributed throughout the matrix in a single layer of particles with the particles protruding from the matrix but being below the upper most level of the wear layer.

3 Claims, 2 Drawing Figures

DURABLE, LOW-MAINTENANCE FLOORING TILE

BACKGROUND OF THE INVENTION

1. Field of the Invention

This invention is related to a decorative plastic floor tile and its method of manufacture.

2. Description of the Prior Art

It is known in the prior art to provide, where desirable, wear resistant layers. Commercial tile has been made having a non-skid surface made by heating individual pieces of ordinary vinyl tile and sprinkling the surface with carborundum grit. One then embeds the grit into the surface of the tile, the grid particles imparting the non-skid characteristic to such tile. It is also known from the prior art to provide a slip resistant surface by providing the plastic flooring product with a nubbly texture by incorporating particulate plastic material dispersed in the wear layer which is cured to form a textured wear layer. This latter is disclosed in U.S. Pat. No. 4,196,243. U.S. Pat. No. 3,267,187 discloses a textured floor covering comprising a base layer, a plastic layer, and an overlying matrix containing particulate material embedded therein. U.S. Pat. No. 4,196,243 teaches that it is old in the art to apply wear layers onto floor coverings, and particularly a non-skid photopolymerizable urethane layer. U.S. Pat. No. 3,928,706 discloses the use of hard quartz particles.

U.S. application Ser. No. 237,666, entitled "Non-Skid Plastic Flooring Product and Method of Manufacture," filed Feb. 24, 1981 in the name of Jesse D. Miller, Jr. et al, commonly assigned with this application, now U.S. Pat. No. 4,348,447 discloses a non-skid decorative plastic floor covering composed of a decorative plastic base having a plurality of slip-resistant elements positioned on the base with a clear or translucent wear layer overlying the slip-resistant elements and the exposed intervening base.

SUMMARY OF THE INVENTION

A decorative plastic floor covering is made with a decorative plastic base having raised and depressed areas. A plurality of elements is positioned on the raised areas only and then thereover a cured clear or translucent wear layer overlies both the elements and the plastic base. The elements comprise particles embedded in a cured plastic matrix which is positioned only on the raised areas of the base. The particles are distributed on the plastic matrix in a substantially abutting relationship with a single layer of particles. The particles protrude above the matrix but are below the upper most level of the wear layer. The particles are rounded inorganic particles of quartz and have a Moh hardness greater than 4. The particles are distributed on the raised area of the base such that none of the particles are greater than about 595 microns, with about 55% of the particles being about 149 to 296 microns in size. The wear layer is a cured urethane composition.

The method of manufacture includes the steps of providing a decorative base layer, applying the plastic matrix or adhesive coating to only the raised areas of the decorative base which has both raised and depressed areas. Particles are then applied to the matrix and the particles are embedded in the matrix in a single layer structure and in a substantially abutting relationship with the upper most portion of the layer of particles protruding from the matrix. The matrix is secured and then there is applied an overall clear wear layer to form the continuous wear film over the cured elements. The upper most portion of the layer of particles are below the upper most level of the wear layer. Subsequently the wear layer is cured in position.

DESCRIPTION OF THE PREFERRED EMBODIMENT

Figure 2:
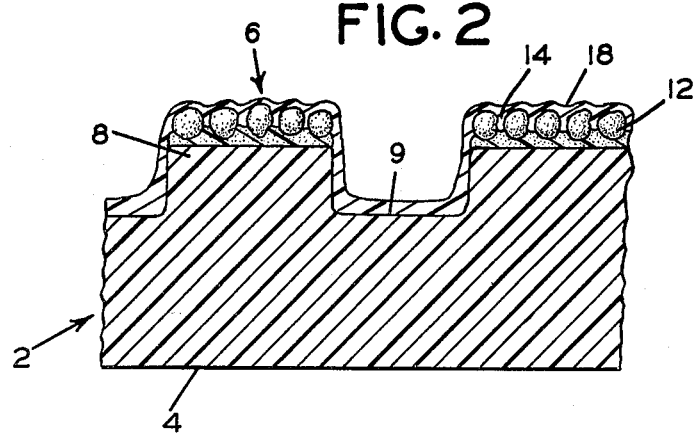
FIG. 2 is a cross-sectional view of floor tile containing the matrix, particles and wear layer coating disclosed herein.

The base layer is a conventional vinyl or vinyl asbestos floor tile material in an approximate size no great than 18"×18" and normally of a size of 12"×12". The product is conventional in the art and it has been provided with an embossed configuration which can be seen in FIG. 2. The tile product 2 has the typically flat base 4 and an upper surface 6 which has raised areas 8 and depressed areas 9. The depressed areas are approximately 18 mils below the surface of the raised areas and vary in width from 1/16 to in excess of ¼ inch. It is possible that the depressed areas of the floor tile could be decorated with a valley printed decorative design. The particular structure is old in the art and is sold by many manufacturers and a very well known particular type of floor tile that could be utilized is the "Excelon" floor tile of Armstrong World Industries, Inc.

Figure 1:
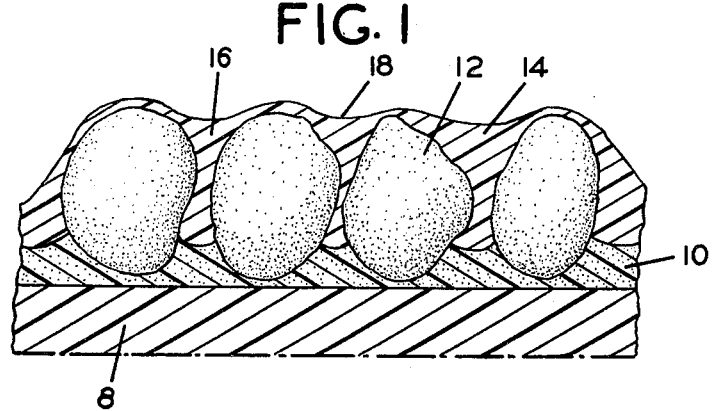
FIG. 1 is an enlarged cross-sectional view of the tile base containing the matrix, particles and wear coat.

Referring now to FIG. 1, to the top of the raised area 8 of the floor tile there is provided a plastic matrix or UV curable adhesive 10. The curable adhesive or plastic matrix is an acrylated polyester curable matrix.

Preparation of Acrylated Polyester Curable Matrix

To form the polyester the following ingredients were charged to a 5 liter, 5-necked flask condenser (upright) with still head and total condenser above. The flask was further equipped with mantle, stirrer, thermometer, temperature controls and gas inlet tube. The ingredients were heated gradually with stirring to 220±5° C. under nitrogen and held at this temperature until the acid number fell below 1.5±0.5. The nitrogen flow was gradually increased after about 70 percent of the theoretical water was obtained to about 700 ml per minute to help remove the water of esterification and drive the reversible equilibrium reaction to completion.

| Ingredients | Parts by Weight |
|---|---|
| 1,6-Hexanediol | 363.52 |
| Neopentyl Glycol | 661.25 |
| Cyclohexanediomethanol | 914.13 |
| Phthalic Anhydride | 563.81 |
| Dibutyltin bis Lauryl Mercaptide Catalyst | 2.48 |
| Isophthalic Acid | 1476.24 |
| Silicone Antifoam (Foamkill 8R) | 0.0566 |
| Toluene | 650.00 |

Acrylation of the polyester is carried out by charging 1.2 equivalents of acrylic acid to an appropriately sized 4-necked flask containing the polyester-solvent mixture. Sulfuric acid (0.24 parts per hundred parts resin) is added and the mixture held at reflux with a Barrett trap used to remove the water and return the solvent.

The batch temperature is held at 95° to 110° C. The reaction was terminated when between 90 and 98 percent of the theoretical water was obtained by cooling to 90° C. and adding 1.3 equivalents of magnesium oxide dispersed in 100 parts by weight isodecyl acrylate with an additional 600 parts by weight of isodecyl acrylate also added. The flask was then evacuated to 40 to 50 mm of mercury to remove solvent. Addition with agitation of 73.14 parts by weight 1,6-hexane-diol diacrylate, 104.5 parts by weight acrylic acid, 100 parts by weight isodecyl acrylate, 104.5 parts by weight benzophenone and 62.7 parts by weight catalyst. 2,2-dimethoxy-2-phenyl-acetophenone (Irgacure 651) completes the curable matrix preparation.

Positioned in the plastic matrix 10 are particles 12 which are preferably rounded inorganic particles. The inorganic particles useful in the practice of the invention to form the wear surface are preferably substantially insoluble in water and have a Moh hardness of at least 4 and preferably at least 7. They must be of a rounded configuration and preferably have a particle size distribution wherein none of the particles are greater than about 595 microns and about 55% of the particles are between 149 and 296 microns in size.

Particularly well adapted for use in the practice of this invention is a grit sold by Ottawa Silica under the tradename "Special Bond." The particles are primarily 99.8% $SiO_2$ with rounded edges on the individual particles.

A typical U.S. sieve analysis of these inorganic silica particles is as follows:

| (Mesh) | Size of Openings | Percent Retained |
| --- | --- | --- |
| Screen 30 | 595 microns | — |
| Screen 40 | 420 microns | 3.0 |
| Screen 50 | 296 microns | 34.0 |
| Screen 70 | 210 microns | 39.0 |
| Screen 100 | 149 microns | 18.0 |
| Screen 140 | 105 microns | 5.0 |
| Screen Pan | | 1.0 |

Finally, the particles and plastic matrix are covered with a wear layer 14 which is a UV curable coating.

Preparation of UV Curable Coating

The following reactants were charged into a reaction vessel:

| Ingredients | Parts by Weight |
| --- | --- |
| Polyester polyol* | 36.15 |
| 2 Ethylhexyl acrylate | 13.33 |
| 1,6 Hexanediol diacrylate | 9.07 |

*Reaction product of 34.62 parts by weight adipic acid, 13.12 parts by weight isophthalic acid, 48.76 parts by weight 1,6 hexanediol and 3.48 parts by weight glycerine.

23.10 parts by weight of 4,4'diisocyanato dicyclohexylmethane and 0.08 parts by weight of dibutyltin dilaurate catalyst were then added and the mixture reacted at 45° C. to 50° C. After the reaction has proceeded for approximately 45 minutes, 8.67 parts by weight of 2-hydroxyethylacrylate was added and heating and stirring of the reaction mixture continued for two hours at which point the isocyanate functionally is constant.

To this reaction product is then added 1.81 parts by weight benzophenone, 0.90 parts by weight 2,2-dimethoxy-2-phenylacetophenone, 6.78 parts by weight paracresol antioxidant and 0.09 parts by weight glycolpolysiloxane (DC-193).

It should be noted that the particles 12 placed on the raised areas 8 of the floor tile 2 are in a single layer. The bottom portions of the individual particles are embedded in the plastic matrix 10 and the upper portions of the particles protrude above the plastic matrix. The wear layer coating 14 covers the particles completely and the upper most regions of the wear layer are above the particles and the wear layer material fills in the area 16 between the particles so that the wear layer is substantially flat with only slight depressions 18 therein between the individual particles. Consequently, the particles are not protruding up above the top surface of the wear layer. The particles are distributed on the raised surfaces 8 of the floor tile so that you have a distribution of about 28 grams of particles per square foot of area covered. The adhesive coating or plastic matrix 10 is applied at the rate of 3.3 to 3.5 grams of material per square foot of tile surface covered. The wear layer is applied at the rate of 22.5 to 23.5 grams per square foot of tile covered. It should be noted that by looking at FIG. 2 the wear layer is not only applied to the top of the surface of the tile containing the particles, but it is also applied to the depressed areas of the tile to coat these depressed areas 9. Consequently, the total surface both raised and depressed of the tile is covered by the UV curable wear layer 14.

The product is made by taking a conventional vinyl or vinyl asbestos floor tile which has been embossed valley printed in a conventional manner. This particular product will be approximately 1/16" thick measured from its back to the top of its raised areas. The depressed areas will be approximately 18 mils below the raised areas. The tile product is fed with its surface 6 upward beneath a rotary coater which coats the coating 10 to only the raised areas of the tile. The acrylated polyester composition above described to which has been added 1% by weight benzyl peroxide, is deposited by the coater with a viscosity of about 3500 cps at 30° C. so that it will retain its shape and stay deposited on the raised areas on which it is positioned.

The coated tile is then next passed beneath the feeder which feeds the inorganic particles onto the tile. Particles are essentially flooded onto the entire tile. The tile is then taken under a vacuum and air blow-off device wherein the particles which have not contacted the adhesive on the raised areas are removed. Too thick a coating of adhesive can result in a multilayer of particles at this point and this is not desirable. The tile is then immediately conveyed through a two-roll consolidator with a nip setting such that on exit from the consolidator a monolayer of particles exist in the coated area. The tile is then conveyed under a conventional UV light source and exposed to an amount of radiation sufficient to cure the UV adhesive and hold the particles in place. A rotary brush is then employed to remove any stray particles not in the cured adhesive. The particle coating is in the range between 5 and 15 mils thick.

The particle coated tile is then conveyed through a forward roll coater where a UV curable binder is applied to the surface. This operation forces binder down into the interstices of the monolayer of particles wetting out and preparing these surfaces for a final application of the proper amount of UV binder with a curtain coater. The roll coater applies approximately 14.0 to 14.5 grams per square foot of coating per square foot of tile. There is then a final application of UV curable binder and it is at such a level that the final surface of the product is substantially smooth, yet not thickly coated (see FIG. 1). This second coating is put on at the rate of 8.5 to 9.5 grams per square foot of tile product covered. It is noted that this coating is applied also to the depressed areas as well as the raised areas of the tile. The coating is then cured with UV light.

As used herein the words "substantially abutting" which define the particle relationship, are meant to cover both a contacting and spaced relationship of the particles. The distribution of particles on the surface of the tile are such that some particles are beside or actually touch adjacent particles while other particles are free standing and are not close to or touching other particles.

What is claimed is:

1. A decorative plastic floor covering in tile form comprising a decorative plastic base having raised and depressed areas, and a plurality of elements positioned on the raised areas only, a cured clear or translucent wear layer overlying both the elements and the plastic base, said elements comprising particles embedded in a cured plastic matrix positioned only on the surface of the raised areas of the base, said particles being distributed on the plastic matrix in a substantially abutting relationship with a single layer structure of particles, those particles protruding above the matrix, but being below the uppermost level of the wear layer, the particles are rounded inorganic particles and have a Moh hardness greater than 4, and a particle size distribution such that none of the particles are greater than about 595 microns, and about 55% of the particles are between about 149 and 296 microns.

2. The floor product of claim 1 wherein the wear layer comprises a cured urethane composition.

3. The floor product of claim 2 wherein the wear layer comprises a urethane compound photopolymerized by exposure to ultraviolet light from a fluid coating composition comprising urethane having at least two photopolymerizable ethylenically unsaturated groups of the formula:

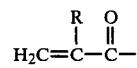

wherein R is either H or CH₃ and wherein the matrix comprises a heat curable acrylated polyester.

* * * * *